Nov. 27, 1928.
J. R. ADAMS
1,693,422
ROLL AND PROCESS OF MAKING SAME
Filed Dec. 24, 1926
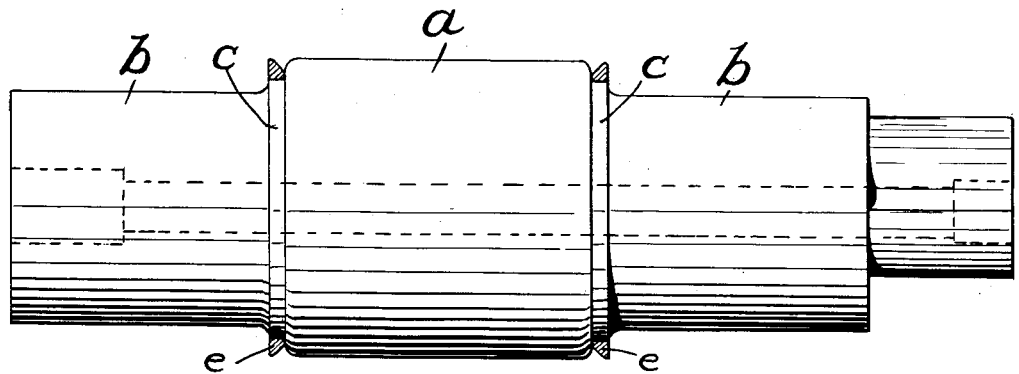
FIG.1.
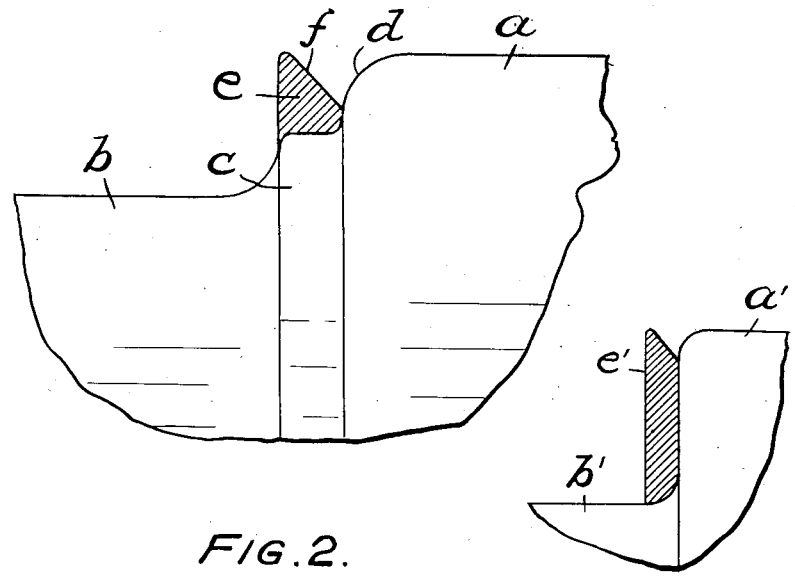
FIG.2.
FIG.3.
INVENTOR
James R. Adams
BY
Busser and Harding
ATTORNEYS.
WITNESS:
Rob R Kitchel Patented Nov. 27, 1928.

1,693,422

UNITED STATES PATENT OFFICE.

JAMES R. ADAMS, OF HATBORO, PENNSYLVANIA.

ROLL AND PROCESS OF MAKING SAME.

Application filed December 24, 1926. Serial No. 156,836.

In the manufacture of hardened steel rolls for rolling brass and other metals, it is customary to provide, at opposite ends of the rolls, circumferential grooves. The utility of these grooves is well understood in the art and need not be herein recited. Both the manufacture and use of such rolls has always been uneconomical. For example, during the cutting of the groove parts of the extreme end of the roll frequently break off, followed, often, by breaking off of a part of the body of the roll adjacent to the groove, thereby spoiling the roll. If the groove be cut without damage to the roll and the roll be subsequently hardened, similar injury to the roll is apt to occur during the hardening process. If the groove be cut after hardening, the likelihood of damage to the roll during the cutting of the groove is increased. Even if the cutting be successfully effected, similar damage to the roll is apt to occur during the final grinding operation. If, however, the roll escapes damage in the successive operations of hardening, groove-cutting and grinding, nevertheless the groove-cutting operation produces an alteration of the balance of internal stresses, with resultant liability to subsequent distortion of the roll. Finally, if a perfect roll be turned out, there is always grave danger of chipping off the material of the roll along its ends, which impairs or destroys its efficiency; and consequently many of the rolls fail in use.

The object of my invention is to manufacture a roll, having substantially the same contour as a roll of the groove type described, in such manner as to avoid loss in manufacture or damage in service.

Different embodiments of my invention are shown in the drawings, in which—

Fig. 1 is an elevational view of a roll embodying my invention.

Fig. 2 is an enlarged view of a part of Fig. 1.

Fig. 3 is a view, similar to Fig. 2, of a modification.

Referring first to the structure shown in Fig. 1:

The roll is cast, forged, rough-machined and heat-treated, or otherwise manufactured, in any known way, except that the contour of the roll is different from that of the ordinary roll that is intended to be subsequently grooved in that the body $a$ is shorter than the usual body and in that between each roll neck $b$ and the roll body is formed a shoulder, providing a ring-holding section $c$ of relatively small length and of a diameter greater than that of the neck and less than that of the body. Preferably, the external contour of the section $c$ is that of the periphery of a cylinder. The end of the shortened roll body should be bevelled and preferably the bevel should be convexly rounded, as shown at $d$.

Rings $e$, of a metal softer than that of the roll, are separately manufactured. The internal contour of each ring corresponds to that of the section $c$. One side of the ring is preferably flat and parallel to the diameter of the ring. The outer corner of the other side of the ring is bevelled, or cut away, as at $f$, but this is not necessarily done before the ring is secured in place. Preferably this bevel is straight in cross-section, as shown. The soft metal ring $e$ is of such size that it is capable of being slipped onto the section $c$ and of being shrunk or fastened thereon by any known method.

In Fig. 3, the shoulder between the roll body $a'$ and roll neck $b'$ is omitted and a ring $e'$ of a metal softer than that of the roll is slipped onto the roll neck and is shrunk or fastened thereon by any known method. The end of the roll body and the adjacent corner of the ring are bevelled or cut away, as in the embodiment shown in Figs. 1 and 2.

Where, in this description, I refer to bevelling, I do not mean to be confined to flat-face bevelling, but intend the term to include different sloping contours, such, for example, as the circumferentially extending rounded ends of the roll body.

After the rings $e$ are so shrunk onto the roll, they provide a roll having all the advantages of a roll in which the grooved ends of the body are integral with the roll. Any subsequent grinding or finishing operation is not attended with danger of chipping. There is no operation that tends to alter the balance of internal stresses and hence there is no tendency to subsequent distortion. In use, there is no substantial danger of spawling off the relatively sharp edges of the roll adjacent to the neck. In short, losses arising from manufacture and damage arising from use are obviated and, aside from avoidance of losses, the cost of manufacture is not enhanced.

Having now fully described my invention, what I claim and desire to protect by Letters Patent is:

1. The process of manufacturing rolls for rolling metal which comprises making a roll provided with end necks and a central body having ends of reduced diameter joining the main part of the body by a circumferentially extending sloping portion, making rings bevelled one on one outside corner and the other on the other outside corner to form circumferentially extending sloping faces and each of a metal softer than that of the body, and securing each ring adjacent the ends of the body with its sloping face adjacent the body, the sloping faces of the body and an adjacent ring forming the sides of a circumferential groove.

2. The process of manufacturing rolls for rolling metal which comprises making a roll with ends of reduced diameter and joined to the major part of the body by a circumferential sloping portion, making rings one bevelled on one side around its circumference and the other beveled on the other side around its circumference and each of a metal softer than that of the body and of a contour adapting it to be secured to the roll adjacent its reduced ends, and so securing each ring with its circumferentially bevelled side adjacent the reduced ends of the roll body.

3. The process of manufacturing rolls for rolling metal which comprises making a roll provided with a central shortened body and end necks, and between the body and each neck a shouldered portion of greater diameter than the neck and of less diameter than the body, making rings one bevelled circumferentially on one side and the other bevelled circumferentially on the other side and each of a metal softer than that of the body and each of an internal diameter adapting it to be secured around one of the shouldered portions, and securing one ring on each of the shouldered portions with its bevel side facing the adjacent end of the roll body.

4. The process of manufacturing rolls for rolling metal which comprises making a roll provided with a central shortened body and end necks, and between the body and each neck a shouldered portion of greater diameter than the neck and of less diameter than the body, making rings one bevelled circumferentially on one side and the other bevelled circumferentially on the other side and each of a metal softer than that of the body and each of an internal diameter adapting it to be shrunk on one of said shouldered portions, and shrinking one ring on each of said shoulder portions with its bevel side facing the adjacent end of the body.

5. A roll for rolling metal comprising a central body, end necks, and separately formed rings adjacent the ends of the body; the ends of the body being of a diameter less than that of the diameter of the major part of the length of the body and being joined thereto by a circumferential sloping portion, the rings having a maximum outside diameter substantially equal to the diameter of the major part of the body and having circumferentially extending faces sloping from their maximum diameters toward the small diameter ends of the body.

6. A roll for rolling metal comprising a central body, end necks, and shouldered portions connecting the necks and the body and each of a diameter less than that of the body and greater than that of the neck, and rings of softer material than the body secured adjacent the ends of the roll body, each end of the body and the side of the ring adjacent thereto having opposing sloping faces forming a circumferential groove.

7. A roll for rolling metal comprising a central body, end necks, and shouldered portions connecting the necks and the body and each of a diameter less than that of the body and greater than that of the neck, and shrunk-on rings of softer metal than the body embracing the shoulders and circumferentially bevelled on the sides thereof facing the body.

8. A roll for rolling metal comprising end necks, a central body having convexly rounded ends, and shouldered portions connecting the necks and the body and each of a diameter less than that of the body and greater than that of the necks, and shrunk-on rings of softer metal than the body embracing the shoulders and of a width substantially equal to the width of the shoulders and of a thickness substantially equal to the difference between the diameters of shoulders and body, each ring being bevelled from near its outer edge toward its inner edge to provide a face which, in conjunction with the rounded end of the body, provides a circumferential groove.

9. A roll for rolling metal comprising a hardened body having ends of a diameter less than the body joined to the body by a sloping portion, roll necks of a less diameter than the body, shouldered portions of less diameter than the body and of greater diameter than the necks and joining the ends of the body and necks, and shrunk-on rings of metal softer than the body embracing the shouldered portions and of a width substantially equal to the width of the shoulders and of a maximum outside diameter substantially equal to the diameter of the body, each ring having a face sloping from its maximum diameter towards the body of the roll and of a minimum outside diameter substantially equal to the minimum diameter of the end of the roll body, thus producing circumferential grooves of any desired cross section.

In testimony of which invention, I have hereunto set my hand, at Philadelphia, Pennsylvania, on this 21st day of December, 1926.

JAMES R. ADAMS.